June 24, 1941.  J. DELSUC  2,247,288
GYROMAGNETIC COMPASS
Filed June 3, 1939  3 Sheets-Sheet 3

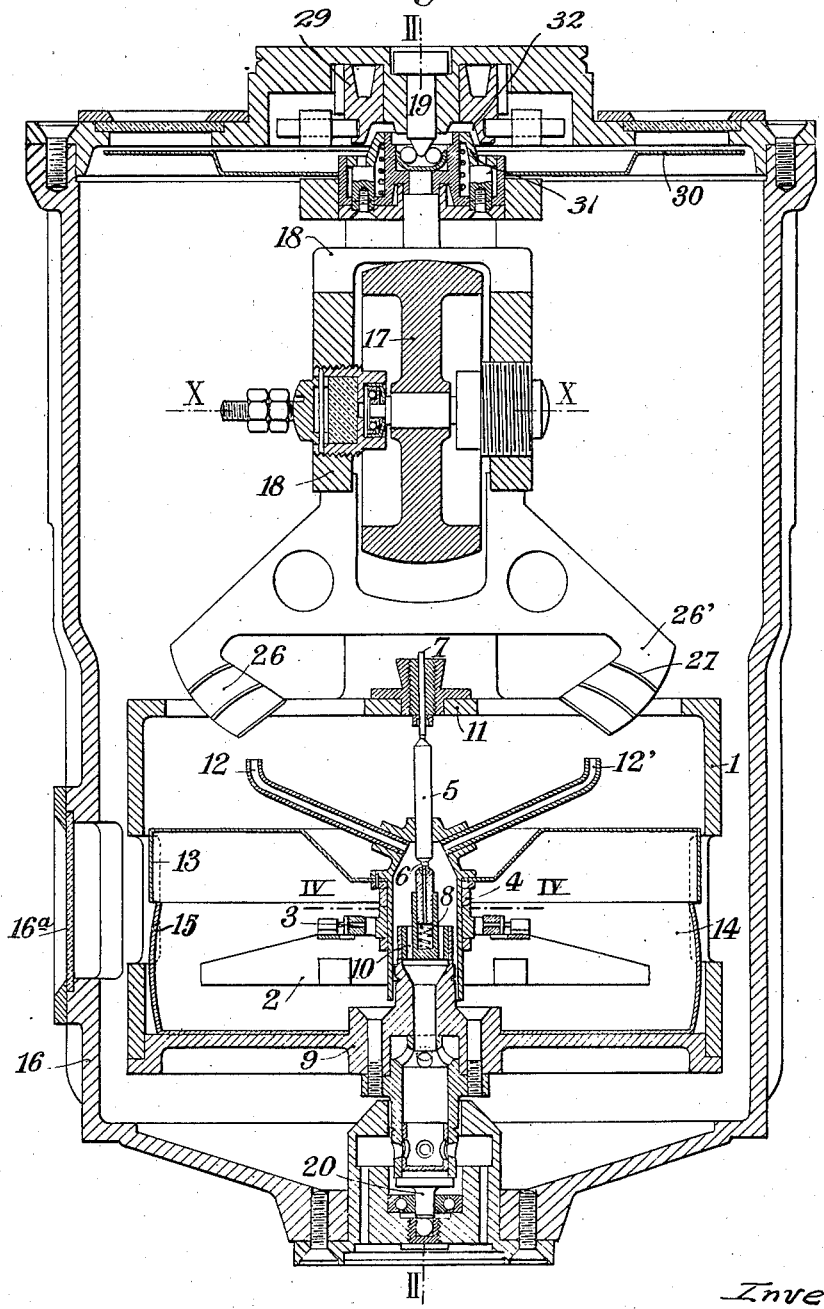

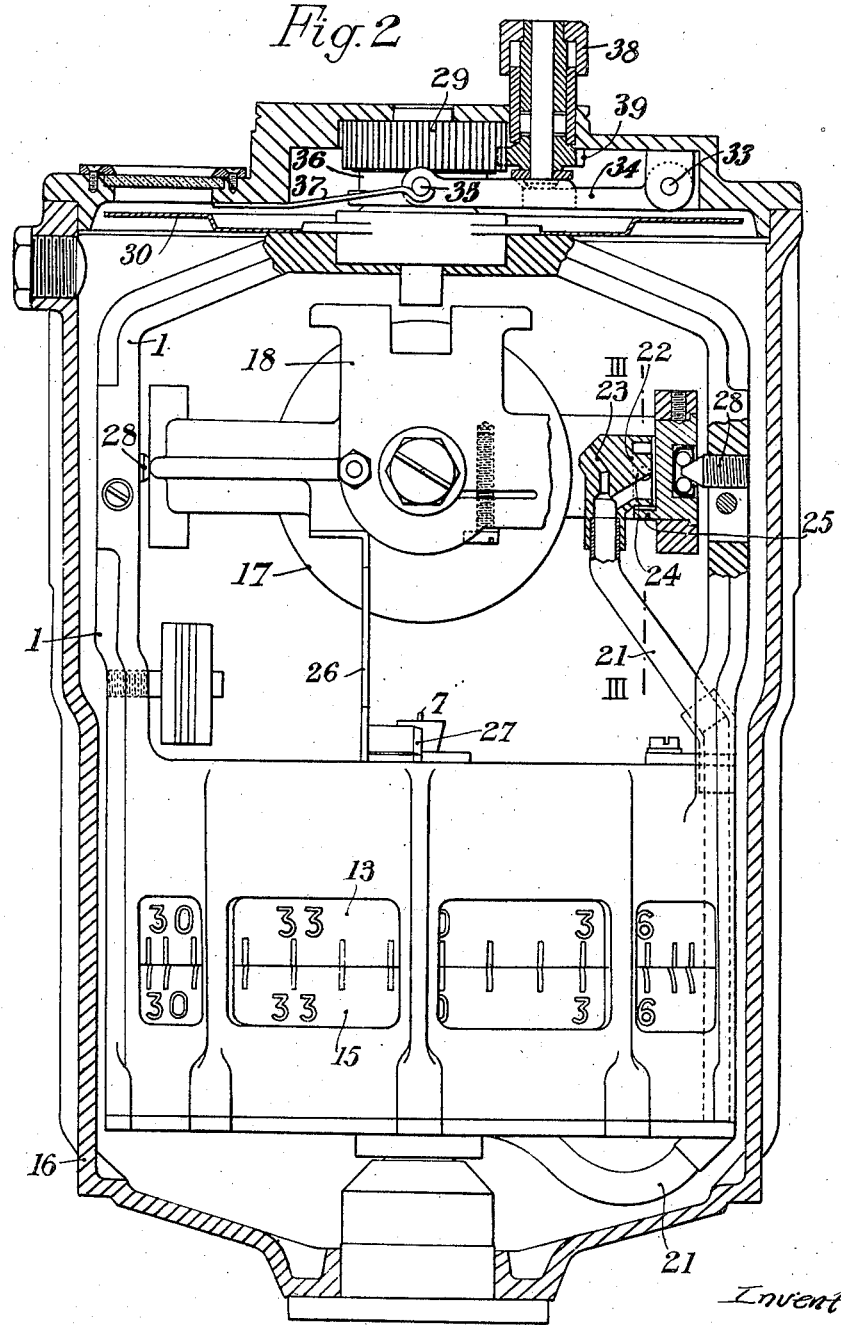

Inventor
J. Delsuc
by Glascock Downing & Seebold
Attys.

Patented June 24, 1941

2,247,288

UNITED STATES PATENT OFFICE 2,247,288

GYROMAGNETIC COMPASS

Jacques Delsuc, Paris, France, assignor to Société Anonyme: Ateliers J. Carpentier, Paris, France Application June 3, 1939, Serial No. 277,274
In France June 4, 1938

5 Claims. (Cl. 33—222)

The present invention relates to a magnetic gyro-compass adapted to be used on all navigation machines which by their nature and their speeds of utilisation are liable to be subjected to important accelerations which may warp, by their dynamic effects, the normal operation of the magnetic compasses usually employed.

Such a magnetic gyro-compass can be advantageously used in particular on board airplanes.

In prior arrangements the gyroscope was used both for maintaining during short periods the mean direction which was indicated to it by the magnetic unit and for obtaining a trim stabilization of the magnetic unit about a horizontal axis.

In carrying out the present invention the first of the functions is alone retained, and the elimination of the disturbing effects of acceleration is obtained by the use of a very long period of setting the gyroscope on the magnetic unit since accidental accelerations to which airplanes are subjected are usually of short duration. The elimination of the disturbing effects of acceleration may be accomplished by the use of a setting system such that any effect of readjusting the gyroscope on the magnetic unit ceases when the space separating these two elements exceeds a given angle.

A form of construction of the subject-matter of the invention is illustrated by way of example in the accompanying drawings, in which:

Fig. 1 is a vertical section thereof made through the main axis of the device.

Fig. 2 is a side elevation in which the casing and a part of the movable device are sectioned according to line II—II of Fig. 1.

Figure 4:
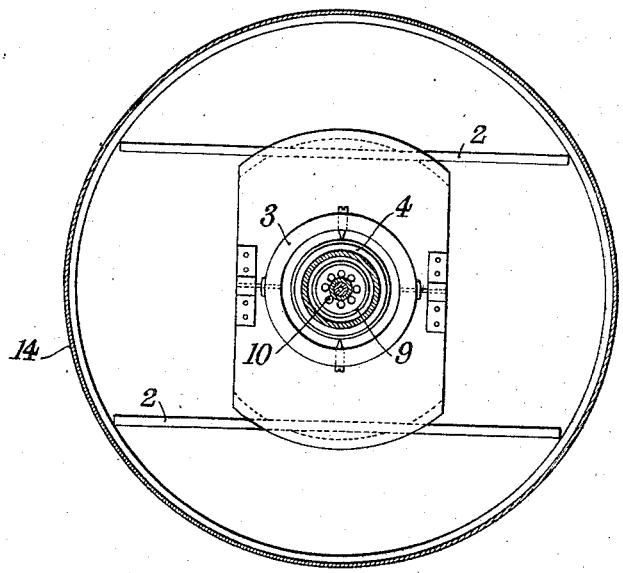
Fig. 4 is a horizontal section made according to line IV—IV of Fig. 1.
Figure 3:
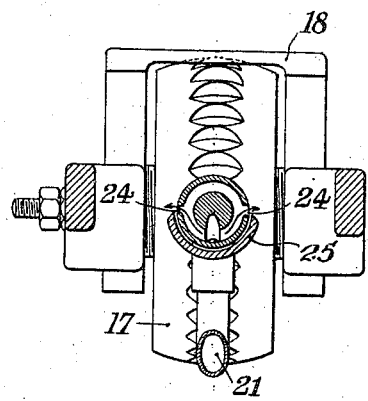
Fig. 3 is a vertical section made according to line III—III of Fig. 2.

The compass comprises a casing 16 in which a partial vacuum can be created and which encloses: a main frame or orientation frame 1 which supports the magnetic unit and the gyroscope 17, 18. The two devices are therefore mounted within one and the same frame, this allowing a direct control of one to the other.

The magnetic unit is constituted by bar magnets such as 2 mounted, either rigidly, or, as shown, through the medium of a Cardan joint system 3 on a cylindrical bell 4 having a vertical axis. The bell 4 carries, according to its axis, the pivotal axis 5 hung from two pivots, a lower pivot 6, and an upper pivot 7.

For damping the eventual vibrations, the fork 6 is supported by a spring 8. The unit 6—8 is supported by a hollow column 9 the upper part of which is perforated with orifices 10 which put the interior of the column 9 in communication with the inner part of the bell 4.

The bell 4 is adjusted with slight play on the column 9.

The column 9 is rigid with the orientation frame 1.

The upper pivot 7 is carried by a cross member 11 rigid with the frame 1.

The bell 4 carries, in addition to the magnetic unit 2, two nozzles 12 and 12', the orifices of which are so arranged that the air jets issuing therefrom exert no reaction on the bell which is capable of imparting a rotational torque about the axis 5. In the case illustrated, the outlet axes of these nozzles are parallel to the axis 5 and are arranged in a plane containing said axis.

The bell 4 also carries a graduated compass card 13, so arranged that its position can be compared to that of the orientation frame.

For that purpose, the latter carries a bowl 14 made of red copper and having a spherical edge which contains the unit 2 of which it constitutes the damping device and which is graduated at its periphery.

The compass card 13 and the rim 15 of the bowl 14 are juxtaposed and a glass window 16ª allows of comparing their graduations through the casing 16 of the instrument.

The gyroscopic unit is constituted by a torus 17 supported through the medium of a ball bearing in a precession frame 18. This frame is supported in its turn by the orientation frame 1, by means of pivots 26.

The orientation frame 1 is supported so as to be capable of pivoting about a vertical axis by an upper pivot 19 and a lower pivot 20 mounted in the casing 16. The pivot 20 comprises a fluid-tight joint which allows of causing the pressure of the outside air to penetrate to the column 9 and, to pipe-lines 21 rigid with the orientation frame.

The pipe-lines 21 supply a box 22 with air, which distributes the pressure to the nozzle 23 driving the gyroscope, and to the orifices 24 of the stabilizer.

The stabilizer comprises said orifices 24 rigid with the orientation frame and a half-crown 25 rigid with the precession frame. Said half-crown normally covers equal portions of the orifices 24, but uncovers entirely one orifice while closing the other when the stabilizer enters in action for one reason or another.

The precession frame 18 carries two segments provided with vanes 26 and 26' limited by beveled rims such as 27. Said rims are arranged adjacent the magnetic unit and can be subjected to the action of the air jets issuing from the nozzles 12 and 12'.

The general relative arrangement of the various elements is such that, during normal operation, the axis of rotation X X of the gyroscope, the plane of the edges of the rims 27, the magnetic axis of the unit 2, the axial plane of the nozzles 12 and 12' are all entirely contained in the meridian plane. In this position the air jets issuing from 12 and 12' equally strike against the segments 26 and 26'.

In the case of a relative slow deviation between the gyroscope and the magnetic unit, such as can be produced by driving or by precession, one of the segments 26 or 26' comes entirely under the action of the corresponding air jet, whereas the other leaves said action. By precession, the gyroscope (all the directions of rotation having been determined for that purpose) comes back at this moment so as to restore its axis of rotation in the meridian plane.

In the case of a rapid relative deviation, such as can be produced under the action of horizontal acceleration on the element of low inertia (in this case the magnetic unit), said deviation will, generally speaking, be of great amplitude, sufficient in any case for the segments having vanes 26, 26' of small width, not to remain under the action of the returning air jets. The setting will therefore cease during the periods of great relative deviation.

If the horizontal acceleration is of a sufficiently low value for the returning action not to be exerted, the precession torque having been chosen small enough for the returning action to be exerted slowly, and the horizontal accelerations of small amplitude being always of very short duration, the axis of rotation of the gyroscope will not be deviated appreciably from the meridian plane.

The stabilizer has a double function in that it maintains the plane of the precession frame 18 at right angles to the plane of the orientation frame 1, according to the usual practice of stabilizers of this type and it acts for eliminating certain disturbing driving or resistant torques which may act on the pivots of the orientation frame.

If the gyroscope is being guided by the magnetic unit: one of the segments 26 or 26' is subjected to the action of the jet from one of the nozzles 12 or 12'. By precession, the orientation frame 1 rotates about its vertical axis. If, however, in this movement, a disturbing resistance is produced, the frame 1 will cease to rotate. The frame 18 will then rock, uncovering one of the orifices 24 and the air jet thereof will create a reaction which will help the orientation frame 1 to pass the difficult point or to overcome the disturbing resistance.

If it is a matter of a driving stress of frame 1, the frame 18 will rock in the same way, by precession.

In these cases, the gyroscope acts as detector of disturbing forces.

In addition to what has been described above, the device according to the present invention may include an optional or compulsory number of optional or compulsory accessories.

For instance, it is necessary to provide the instrument with a set of levers and gears allowing, at the moment of starting, to set the gyroscope on the magnetic unit, by locking the movements of the precession frame 18. For example, as shown in Figs. 1 and 2, the frame 1 carries a friction cone 31 which rotates therewith. A vertically movable gear wheel 29 is mounted in the center of the cover of the casing 16. The under face of the gear wheel 29 is provided with a conical-shaped recess 32 adapted to frictionally cooperate with the cone 31. A forked lever 34 is pivotally mounted at 33 under the cover of the casing. The lever 34 is provided with pins 35 which extend into an annular groove 36 of the gear wheel 29. The lever 34 is normally lifted by means of a spring 37 so that the gear wheel 29 is held out of contact with the cone 31. The orientation frame 1 is then free to pivot about its vertical axis. The lever 34 may be lowered by pressing on a knob 38 in order to move the gear wheel 29 against the cone 31 to thereby establish the frictional coupling between the gear wheel 29 and the frame 1.

The knob 38 is also provided with a pinion 39 which engages the teeth of the gear wheel 29. Thus by rotating the knob 38 the orientation frame 1 can be rotated.

It is optional to place at the apex of the orientation frame a horizontal compass card 30 for facilitating navigation.

What I claim as my invention and desire to secure by Letters Patent is:

1. A gyro-magnetic compass comprising, a closed casing from which air may be exhausted, an orientation frame pivoted in said casing about a vertical axis, a magnetic unit mounted within said frame for independent movement about said vertical axis, a bell-shaped member within said casing connected to rotate with said unit and having two diametrically opposed nozzles directed upwardly in the vertical plane of said unit, there being an air passage leading from the exterior of said casing to said nozzles, a gimbal frame pivotally mounted about a horizontal axis in said orientation frame, a gyroscopic rotor pivotally mounted in said gimbal frame for spinning about an axis normally in the vertical magnetic plane of said unit, means spinning said rotor, a support rigid with said gimbal frame and having blades respectively arranged above said nozzles each normally equally intercepting a respective jet and so arranged as to receive the impulse of said jets only over a small angle of relative azimuthal deviation between the gyro spin axis and magnetic unit, a stabilizing device having means forming opposed horizontal air jets carried by the orientation frame, and shielding means on the gimbal frame normally equally intercepting each jet for urging the gyro spin axis to normally horizontal position.

2. A gyro-magnetic compass as claimed in claim 1 including a graduated compass card carried by the orientation frame, a graduated compass card carried by the bell connected to the magnetic unit, and said compass cards being arranged concentrically adjacent each other.

3. A gyro-magnetic compass as claimed in claim 1 including a graduated compass card carried by the orientation frame, said compass card being formed of red copper in the shape of a bowl having a spherical periphery portion surrounding the magnetic unit.

4. A gyro-magnetic compass as claimed in claim 1 in which the supports of the blades consist of a vertical plate secured to the gimbal frame at right angles to the axis of oscillation thereof and spaced from the vertical axis of rotation of the orientation frame, and said blades extending from said plate to a vertical plane passing substantially through said vertical axis.

5. A gyro-magnetic compass as claimed in claim 1 said stabilizing device comprising, a semi-circular rib carried by the gimbal frame and concentric with the horizontal pivoting axis thereof, a cylindrical member carried by the orientation frame and concentric with the horizontal pivotal axis and arranged with slight play within said semi-circular rib, said cylindrical member having two orifices opening at diametrically opposite points adjacent respective edges of said rib, and means for supplying a continuous air stream through said member to said orifices.

JACQUES DELSUC.